June 6, 1961 T. L. URQUHART 2,987,144
BRAKE FOR DOOR TRACK ROLLER
Filed Oct. 7, 1957 3 Sheets-Sheet 1
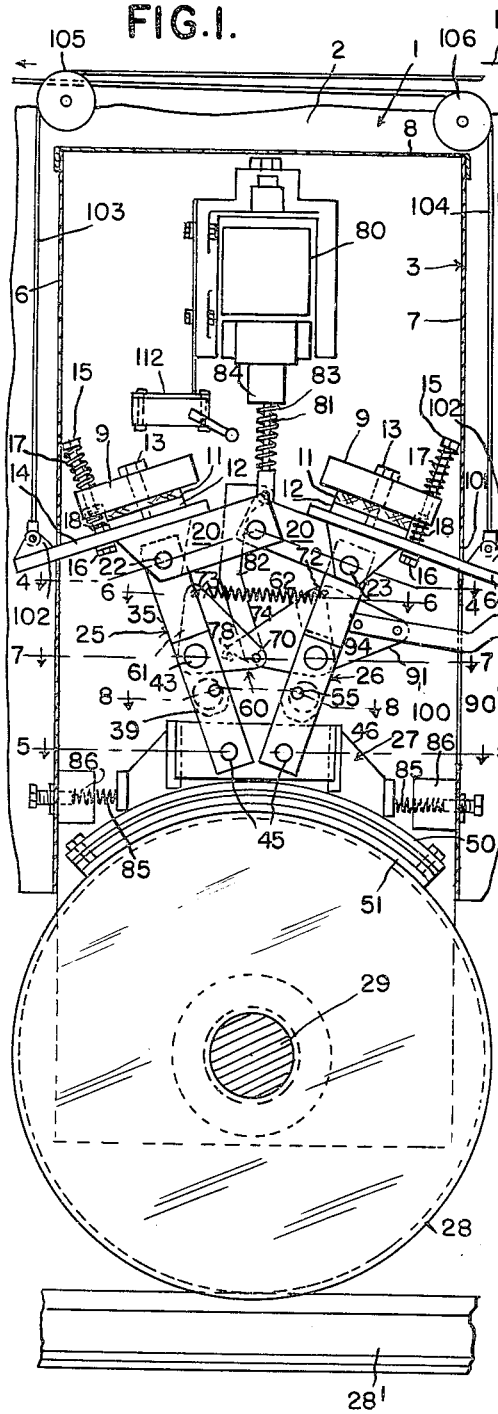
FIG.I.
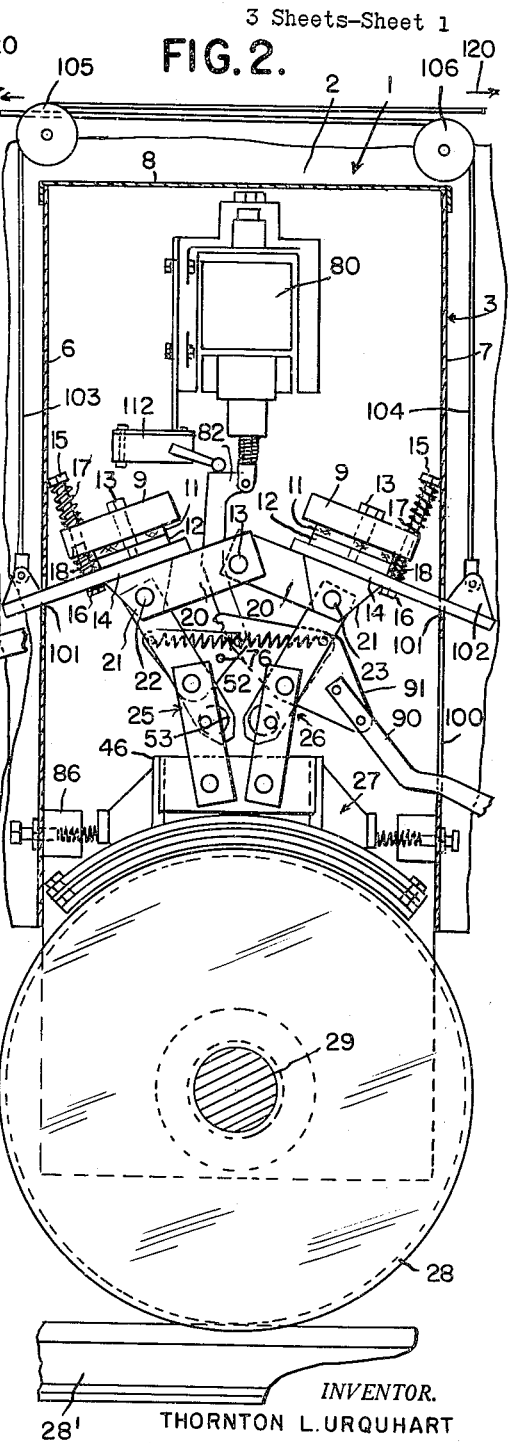
FIG.2.
INVENTOR.
THORNTON L. URQUHART
BY
Whittemore, Hulbert & Belknap
ATTORNEYS June 6, 1961 T. L. URQUHART 2,987,144
BRAKE FOR DOOR TRACK ROLLER
Filed Oct. 7, 1957 3 Sheets-Sheet 2

INVENTOR.
THORNTON L. URQUHART
BY
*Whittemore, Hulbert & Belknap*
ATTORNEYS

June 6, 1961 T. L. URQUHART 2,987,144
BRAKE FOR DOOR TRACK ROLLER
Filed Oct. 7, 1957 3 Sheets-Sheet 3
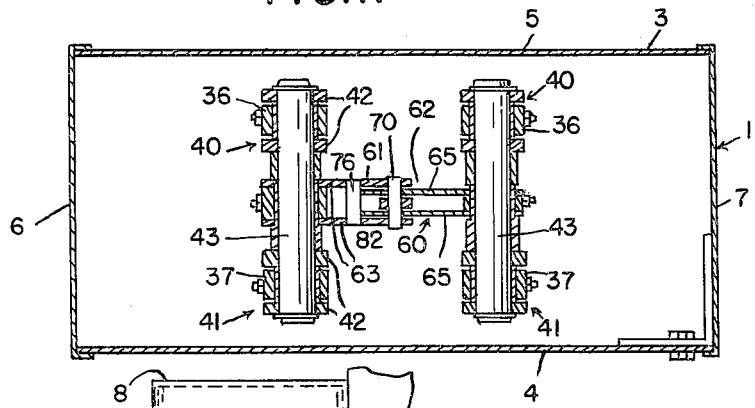
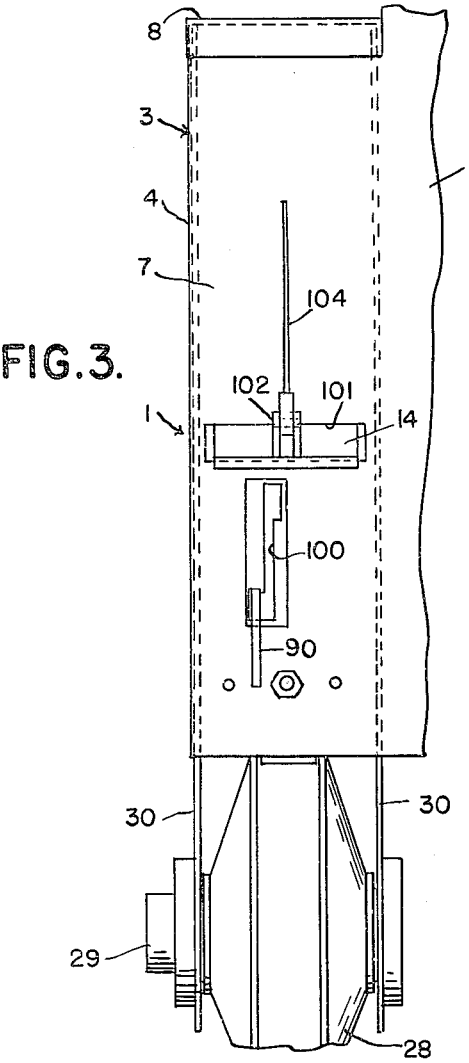
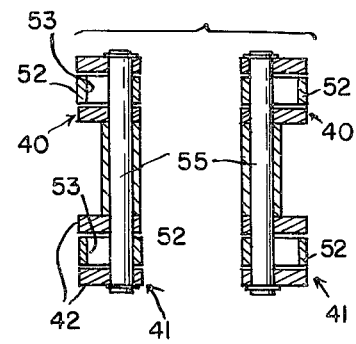
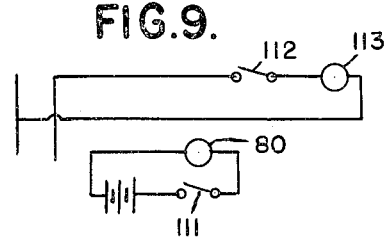
INVENTOR.
THORNTON L. URQUHART
BY
Whittemore, Hulbert & Belknap
ATTORNEYS

United States Patent Office 2,987,144
Patented June 6, 1961

2,987,144
BRAKE FOR DOOR TRACK ROLLER
Thornton L. Urquhart, Farmington, Mich., assignor to Byrne Doors Inc., Ferndale, Mich., a corporation of Michigan
Filed Oct. 7, 1957, Ser. No. 688,587
10 Claims. (Cl. 188—74)

This invention relates to brake systems and refers more particularly to a brake for a door track roller.

One object of this invention is to provide a brake for a door track roller which is efficient in operation and capable of stopping and holding a door of great weight.

Another object of the invention is to provide a brake for a door track roller which is self-energizing.

Still another object of the invention is to provide a brake for a door track roller which is adjustable to vary the braking action and which is operative in both directions of movement of the door.

A further object of the invention is to provide a brake for a door having means for automatically rendering inoperative the power means for moving the door when the brake is applied.

A still further object of the invention is to provide a brake for a door having means for automatically releasing the brake when a moving force is applied to the door by a tractor or the like, in the event of a power failure, for example.

Other objects and features of the invention will become apparent as the description proceeds, especially when taken in conjunction with the accompanying drawings, illustrating a preferred embodiment of the invention, wherein:

FIG. 1 is a side elevational view partly in section of a brake mounted on a door in association with a roller, in accordance with the invention.

FIG. 2 is similar to FIG. 1 but shows certain parts in different positions.

FIG. 3 is an elevational view of the structure shown in FIGS. 1 and 2 looking at the right side of the structure in the latter figures.

FIGS. 4, 5, 6, 7 and 8 are sectional views taken along the lines 4—4, 5—5, 6—6, 7—7 and 8—8 respectively, of FIG. 1.

FIG. 9 illustrates a wiring diagram.

Figure 4:
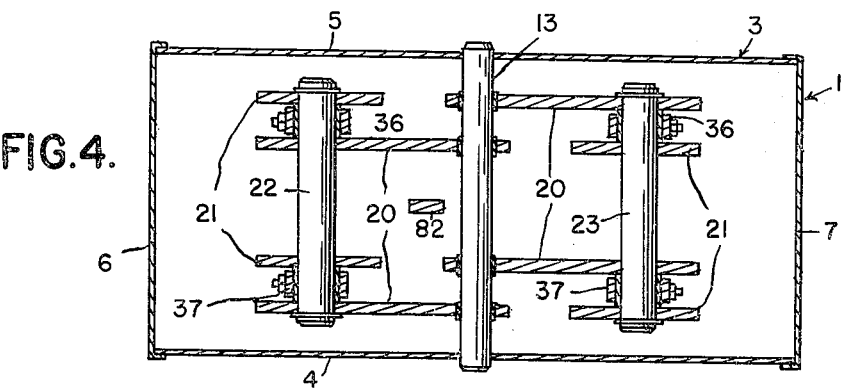
Figure 5:
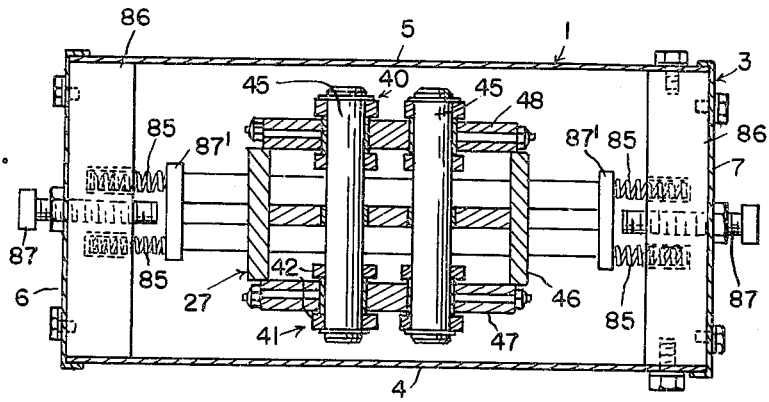
Figure 6:
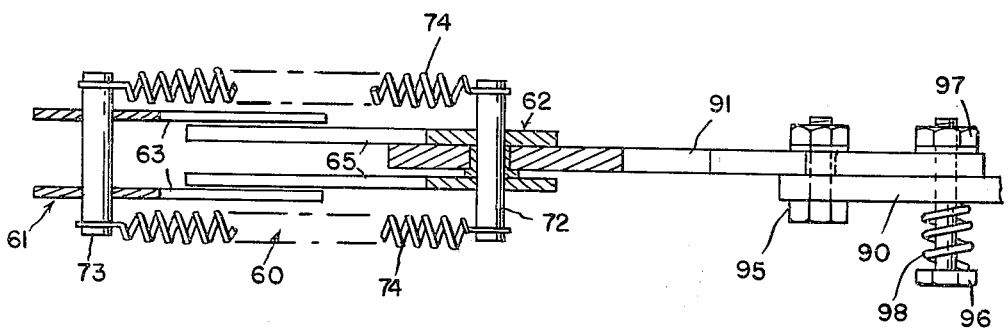

The brake is generally indicated at 1 and is mounted on a door 2. The door 2 may be an extremely massive structure and may be employed as the closure for an airplane hangar opening, for example. The brake 1 comprises a housing 3 rigidly secured to the door 2. The housing is rectangular in cross-section as seen in FIGS. 4, 5 and 7, and has the front and rear walls 4 and 5 and the side walls 6 and 7. The bottom of the housing is open and the top is closed by a cover plate 8.

A pair of mounting blocks 9 are rigidly secured to and within the housing. The blocks 9 are in the form of flat plates extending from the front to the rear wall of the housing and secured thereto in any suitable manner. The blocks 9 are identical in construction and each has a rubber pad 11 clamped to the under side by a metal pad 12. The pads 11 and 12 are substantially co-extensive and extend from a point adjacent the front wall to a point adjacent the rear wall. Bolts 13 extend through each of the mounting blocks 9, loosely through aligned openings in the associated rubber pad 11 and threadedly engaging the associated metal pad 12. The compression on the rubber pads 11 may be varied by simply rotating the bolts 13. Two bolts are provided for each mounting block 9, only one of which is shown in the drawings.

A pressure plate 14 is held against the under side of each of the metal pads 12. The pressure plates 14 are of identical construction. Bolts 15 extend freely through aligned openings in the blocks 9 and the pressure plates 14 and have nuts 16 threaded on the lower ends thereof. Two nut and bolt assemblies are provided for each of the blocks 9 and pressure plates 14 although only one is shown in the drawings. A coil spring 17 encircles each bolt and is compressed between the head of the bolt and the associated block 9 urging the pressure plates upwardly against the metal pads 12. A spring 18 encircles each bolt and is compressed between the associated pressure plate and mounting block opposing the springs 17.

The springs 17 are normally about twice as long as the springs 18 and are compressed to a greater degree so that they have a greater force. The force of the springs 17 is sufficiently greater than that of the springs 18 to hold the pressure plates up against the associated pads 12 under a small initial pressure and also to support the toggle and brake mechanism supported by the pressure plates and described more fully hereinafter. The tension of the springs may be varied by the nut 16.

A pair of pressure plate arms 20 are secured to the bottom of each pressure plate 14 in laterally spaced relation. The arms of each pair project toward the arms of the other pair and the adjacent ends of the arms are pivoted to the shaft 13 which extends horizontally within the housing and is secured at its ends to the front and rear walls of the housing. A pair of pressure plate brackets 21 are secured to the under side of each pressure plate in laterally spaced relation. As seen in FIG. 4, the brackets 21 are respectively associated with and located adjacent to the arms 20.

A shaft 22 extends parallel to shaft 13 and extends through aligned apertures in the arms 20 and brackets 21 of one pressure plate 14. A shaft 23 also extends parallel to shaft 13 and through aligned apertures in the arms 20 and brackets 21 of the other pressure plate. The shafts 22 and 23 are held against axial movement by any suitable means such as lock rings on the ends of the shafts.

A toggle device 25 is carried by the shaft 22 and a toggle device 26 is carried by the shaft 23. The toggle devices 25 and 26 support the friction device 27 above the roller 28. The roller 28 is one of several which are journaled on the door and support the door for movement in the direction of its length and in opposite directions along the track 28'. The wheel 28 has an axle 29 journaled in the supporting members 30 carried by the door structure and housing 3.

The toggle device 25 has an upper link 35 which includes two members 36 and 37. The members 36 and 37 are pivoted at their upper ends to the shaft 22. Each of the members is disposed between an arm 20 and its associated bracket 21 to hold the arm against movement axially of the shaft.

The toggle device 25 also has a lower toggle link 39 which includes a pair of members 40 and 41. Each of the members 40 and 41 comprises a pair of plates 42. The plates 42 are of identical construction and at their upper ends are pivoted to the shaft 43 which extends parallel to the shaft 22. The upper link members 36 and 37 are pivoted to the shaft 43 between the plates 42 of the rsepective link members of the lower toggle link.

The lower ends of the plates 42 are formed with apertures for receiving the shaft 45 which extends parallel to the shafts 22 and 43. The shaft 45 cooperates with a similar shaft carried by the other toggle device 26 and also identified by the numeral 45 to support the friction device 27. The friction device 27 comprises the frame 46 having the front and rear plates 47 and 48 through which the shafts 45 extend. The shafts 45 are freely rotatable relative to the plates 47 and 48. The friction device has a shoe 50 secured to the bottom of the frame 46 and of arcuate shape corresponding to the periphery of roller 28. The brake lining material 51 is secured to the concave or under side of the brake shoe.

Each of the upper link members 36 and 37 has an extended portion 52 which extends beneath the shaft 43. The extended portions 52 of each member are formed with aligned through openings 53. The plates 42 of the lower link members 40 and 41 are formed with aligned apertures for receiving the pin 55. The pin is rigidly secured in the apertures of the plates and extends through the openings 53 in the extended portions 52 of the upper toggle link members. The pin 55 permits relative angular movement between the upper and lower links of the toggle 25 between the position shown in FIGS. 1 and 2 being limited by engagement of the pin with the opposite sides of the openings 53.

The other toggle device 26 is identical in construction with the device 25 and accordingly corresponding parts of the device 26 are identified by the same reference characters.

The toggle devices 25 and 26 are interconnected by the toggle device 60. The toggle device 60 comprises the toggle links 61 and 62. The toggle link 61 comprises a pair of identical plates 63 which are generally triangular and which have aligned apertures adjacent one corner for pivotally receiving the shaft 43 of the toggle device 25. The link 62 comprises a pair of plates 65 which are identical and also of generally triangular shape. The plates 65 are formed adjacent one corner with aligned apertures for pivotally receiving the shaft 43 of the toggle device 26. The toggle links 61 and 62 extend toward each other and the overlapping portions of the toggle link plates are pivoted together by a pin 70 which extends through aligned apertures in the overlapping portions. The upper portions of the plates of each of the links 61 and 62 are formed with aligned apertures for receiving the pins 72 and 73, and the tension coil springs 74 extend between the pins to urge the upper portions of the links toward one another. The plates 63 have secured thereto and extending therebetween an abutment pin 76 which is engageable by the latch portion 78 on the end of each plate 65 of the other link member limiting the movement of the link members 61 and 62 in the direction urged by the tension springs 74. When the pin 76 is engaged with the latch portions 78, the toggle devices 25 and 26 are in their extended or operative positions of FIG. 1 in which the brake lining 51 engages the periphery of the roller.

The toggle devices 25 and 26 may be broken, at which time they assume the FIG. 2 position, by the solenoid 80 secured to the housing. Solenoid 80 has a core (not shown) to which is connected a plunger 81. The enlarged lower end of the plunger is connected to a link 82, and the lower end of the link 82 is connected to the pin 70 connecting the links of the toggle device 60. A coil spring 83 encircles the reduced portion of the plunger and is compressed between the depending housing portion 84 for the solenoid and the lower enlarged end of the plunger, normally urging the plunger to the FIG. 1 position. When the solenoid is energized, the plunger is raised to the FIG. 2 position, breaking the toggle devices 25 and 26 and lifting the brake shoe lining clear of the roller.

The brake shoe is normally centered to the position illustrated by the centering springs 85. Two such springs engage each end of the brake shoe housing part 87'. The springs at one side of the brake shoe are supported in recesses in a block 86 carried by the housing 3, and the springs at the other side of the shoe are likewise received in recesses in a second block 86 carried by the housing. Screws 87 are threadedly engaged in the blocks 86 and the shank ends of the screws are engageable with the adjacent portions of the brake shoe housing parts 87' and serve as a positive stop limiting movement of the shoe. The screws may be adjusted by rotation to vary the position of the shank ends.

A manual lever 90 is provided for breaking the toggle devices 25 and 26 in the event of a power failure rendering the solenoid 80 inoperative. The lever 90 is connected to a plate 91 pivoted to the pin 72 connecting the plates of the link 62 of the toggle device 60. The plate 91 has a portion 94 which fulcrums on the shaft 43 connecting the links of the toggle device 26. The lever 90 is somewhat loosely connected to the plate 91 by the nut and bolt assembly 95 and by a second nut and bolt assembly comprising a bolt 96 and a nut 97. The shank of the bolt 96 is extra long and a compression spring 98 encircles the shank and is compressed between the head of the bolt and the lever normally pressing the lever tightly against the plate but permitting a lateral or angular movement of the lever relative to the plate. The lever extends through the wall 7 of the housing. The opening 100 in the housing wall which receives the lever is substantially Z-shaped as shown. The lever in FIG. 3 is shown hooked into the lower offset of the opening to retain the toggle devices in the broken condition of FIG. 2. The lever is movable laterally and upwardly into the upper offset of the opening 100 to latch the lever in the position in which the toggle devices 25 and 26 assume the FIG. 1 position by action of springs 74 and 83.

The pressure plates 14 have extensions projecting through openings 101 in the walls 6 and 7 of the housing 3, and brackets 102 are carried by the projecting portions of the pressure plates. Cables 103 and 104 are respectively secured to the brackets and reeved over the pulleys 105 and 106 carried by the door 2.

FIG. 9 illustrates a wiring diagram. A manual switch 111 is provided in the circuit to the solenoid 80. A second switch 112 is provided in the circuit to the motor 113. The motor 113 is operatively connected to the roller 28 or to one of the other rollers supporting the door. Suitable reversing mechanism is associated with the motor and is manually operable to determine the direction of movement of the door. The reversing mechanism for the motor is not shown. The switch 112 may be seen in FIGS. 1 and 2 and is normally open. However when the solenoid is energized by closing switch 111, the operating lever for the switch 112 is engaged by a portion of link 82 to close switch 112 and operate the motor. Normally however when the solenoid is de-energized and the brake set in the FIG. 1 position, the circuit to the motor is open through switch 112.

The brake is normally set as in FIG. 1. Any forces tending to move the door in either direction will be resisted by the brake shoe which engages roller 28. If the door should be urged to the right in FIG. 1 for example the shoe would move slightly with the roller in a clockwise direction. However since the shortest distance between the shaft 23 and the periphery of the roller is less than the distance from the shaft 23 to the periphery of the roller measured on a line through the shaft 45 of toggle device 26, a wedging action will result forcing the brake shoe with increasing force against the periphery of the roller. The same dimensional relationship exists between the shafts 22 and 45 of the other toggle device with the periphery of the roller so that a braking action will also take place resisting rotation of the roller in the opposite direction. The rubber pads 11 provide a yielding action permitting the slight rotary movement of the brake shoe with the roller in either direction. The compressibility of pads 11 may be varied by bolts 15 and nuts 16. The braking action may be reduced by moving the adjustable abutment screws 87 toward the brake shoe to reduce the amount of angular movement permitted of the brake shoe.

The brake is released either by the action of the solenoid when energized or by the manual release lever 90 to raise the shoe clear of the roller.

In the event of power failure, a tractor may be attached to one or the other of the cables 103 and 104 to move the door. If it is desired to move the door to the right as viewed in FIGS. 1 and 2, the tractor will be attached to the cable 103 and a direct pull applied to the cable in the direction of the arrow 120. On the other hand, the tractor may be hitched directly to the door to either push or pull it, and the cable operated by hand.

The cable 103 will lift up and slightly raise the lefthand pressure plate 14 against the resiliency of the associated rubber pad 11 and the pressure plate will be elevated sufficiently to raise the lefthand end of the shoe, through toggle device 25, a distance sufficient to nullify the self-energizing effect of the shoe and prevent it from moving angularly with the roller. Thus, the action of the cable renders the brake inoperative even while the lever 90 is in the upper position of FIG. 1. This action of the cable takes place without breaking either toggle device 25 or 26.

FIGURE 2 shows the toggle devices broken to release the brake, and the solenoid is shown as energized and the manual lever 90 in the brake release position. It will be understod that the lever 90 may be operated to release the brake although the solenoid is de-energized, and that the brake may be released by operation of the solenoid although the lever 90 is in the FIG. 1 position. Likewise the cables are effective to release the brake when the solenoid is de-energized and the lever 90 is in the FIG. 1 position.

What I claim as my invention is:

1. A braking system for a rotatable member having a circular braking surface comprising a friction device, means supporting said friction device close to the braking surface of the rotatable member for movement circumferentially relative thereto, said friction device being engageable with the braking surface of the rotatable member to be moved circumferentially thereby, said supporting means comprising a support, a toggle link mechanism including a pair of toggle arms having their adjacent ends pivoted together for movement into alignment, a first pivotal connection between the opposite end of one of said toggle arms and said support and a second pivotal connection between the opposite end of the other of said toggle arms and said friction device, the distance from said first pivotal connection to the braking surface of the rotatable member measured through said second pivotal connection in the aligned condition of said toggle arms exceeding the shortest distance therebetween, said toggle link mechanism being operative upon movement of its arms into alignment to move said friction device into frictional engagement with the braking surface of the rotatable member and to press said friction device into more firm frictional engagement with the braking surface of the rotatable member in response to circumferential movement of said fraction device in one direction by the rotatable member, and means for moving said toggle arms into alignment.

2. The braking system defined in claim 1 in which said support is yieldable to provide a controlled application of the friction device during braking.

3. The braking system defined in claim 1 having means for breaking said arms of said toggle link mechanism.

4. The braking system defined in claim 1 having means for rendering said toggle link mechanism inoperative to press said friction device into more firm frictional engagement with the braking surface of the rotatable member as aforesaid.

5. The braking system defined in claim 4 wherein said last-mentioned means includes means for holding said friction device against circumferential movement in said one direction.

6. The braking system defined in claim 1 including means for limiting circumferential movement of said friction device in said one direction.

7. The braking system defined in claim 6 including resilient means urging said friction device circumferentially in the opposite direction.

8. A braking system for a rotatable member having a circular braking surface comprising a friction device, means supporting said friction device close to the braking surface of the rotatable member for movement circumferentially relative thereto, said friction device being engageable with the braking surface of the rotatable member to be moved circumferentially thereby, said supporting means comprising a support, a toggle link mechanism including a pair of toggle arms having their adjacent ends pivoted together for movement into alignment, a first pivotal connection between the opposite end of one of said toggle arms and said support and a second pivotal connection between the opposite end of the other of said toggle arms and said friction device, the distance from said first pivotal connection to the braking surface of the rotatable member measured on a line through said second pivotal connection in the aligned condition of said toggle arms exceeding the shortest distance therebetween, said supporting means for said friction device also comprising a second support, a second toggle link mechanism including a pair of toggle arms having their adjacent ends pivoted together for movement into alignment, a third pivotal connection between the opposite end of one of the arms of said second toggle link mechanism and said second support and a fourth pivotal connection between the opposite end of the other of said arms of said second toggle link mechanism and said friction device, the distance from said third pivotal connection to the braking surface of the rotatable member measured on a line through said fourth pivotal connection in the aligned condition of the arms of said second toggle link mechanism exceeding the shortest distance therebetween, said two lines of measurement passing the axis of rotation of the rotatable member on opposite sides thereof, said toggle link mechanisms being operative upon movement of their arms into alignment to move said friction device into frictional engagement with the braking surface of the rotatable member, one or the other of said aligned toggle link mechanisms being operative, in the aligned condition of the arms of said toggle link mechanisms, to press said friction device into more firm frictional engagement with the braking surface of the rotatable member in response to circumferential movement of said friction device in one direction or the other by the rotatable member depending on the direction of rotation of said rotatable member, means for moving the arms of said toggle link mechanisms into alignment, each support including yieldable means to permit movement of the associated toggle link mechanism toward the rotatable member when the friction device is pressed into frictional engagement with the braking surface of the rotatable member by the aligned arms of the other toggle link mechanism.

9. The braking system defined in claim 8 in which each support is yieldable to permit movement of the associated toggle link mechanism away from the rotatable member to provide a controlled application of the friction device during braking.

10. The braking system defined in claim 8 including means positively limiting circumferential movement of said friction device in either direction, and spring means for centering said friction device circumferentially between said limiting means.

References Cited in the file of this patent

UNITED STATES PATENTS

| | | |
|---|---|---|
| 390,316 | Snyder | Oct. 2, 1888 |
| 506,504 | Hollis | Oct. 10, 1893 |
| 524,785 | Monroe | Aug. 21, 1894 |
| 772,536 | Rynerson | Oct. 18, 1904 |
| 1,976,223 | Hedley et al. | Oct. 9, 1934 |
| 2,022,044 | Kohr | Nov. 26, 1935 |
| 2,042,937 | Hendricksen | June 2, 1936 |
| 2,327,583 | Framhein | Aug. 24, 1943 |
| 2,423,129 | Tobias | July 1, 1947 |
| 2,466,693 | Fischer | Apr. 12, 1949 |
| 2,638,183 | Prowinsky | May 12, 1953 |
| 2,823,325 | Stephan | Feb. 11, 1958 |